R. H. BOWEN.
PULLEY.
APPLICATION FILED AUG. 28, 1912.
1,125,643.
Patented Jan. 19, 1915.
4 SHEETS—SHEET 2.
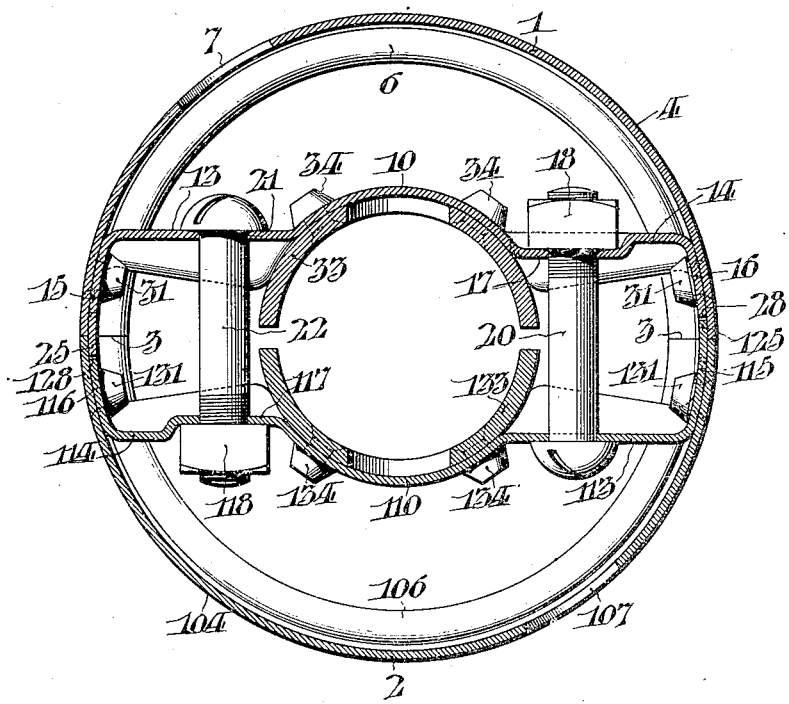
FIG. III.
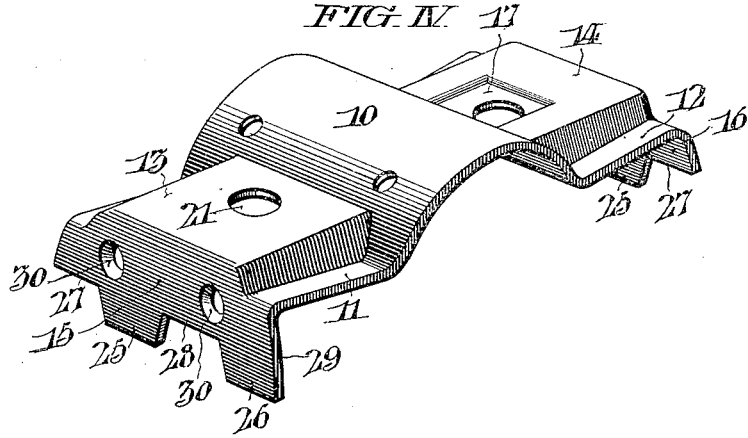
FIG. IV.
Witnesses
John C. Bergner
James H. Bell
Inventor
Russell H. Bowen,
By Macy & Paul
Attorneys R. H. BOWEN.
PULLEY.
APPLICATION FILED AUG. 28, 1912.
1,125,643.
Patented Jan. 19, 1915.
4 SHEETS—SHEET 3.
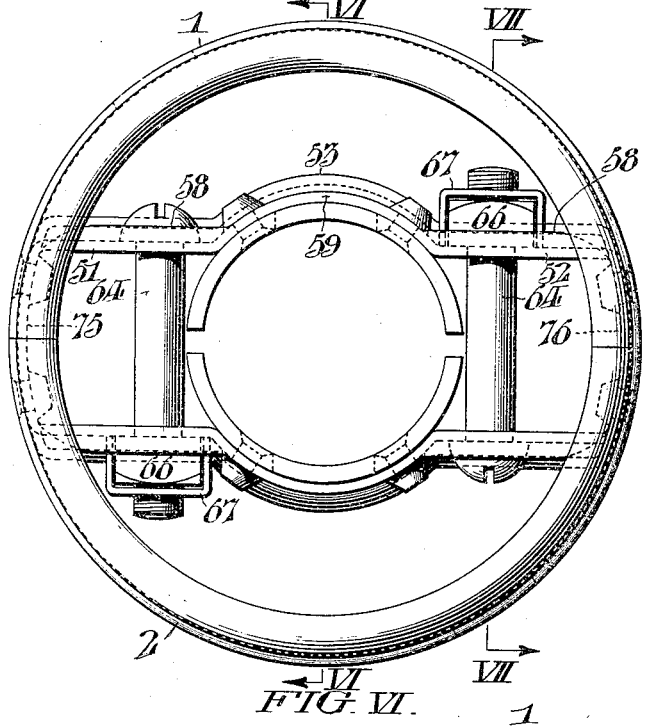
FIG. V.
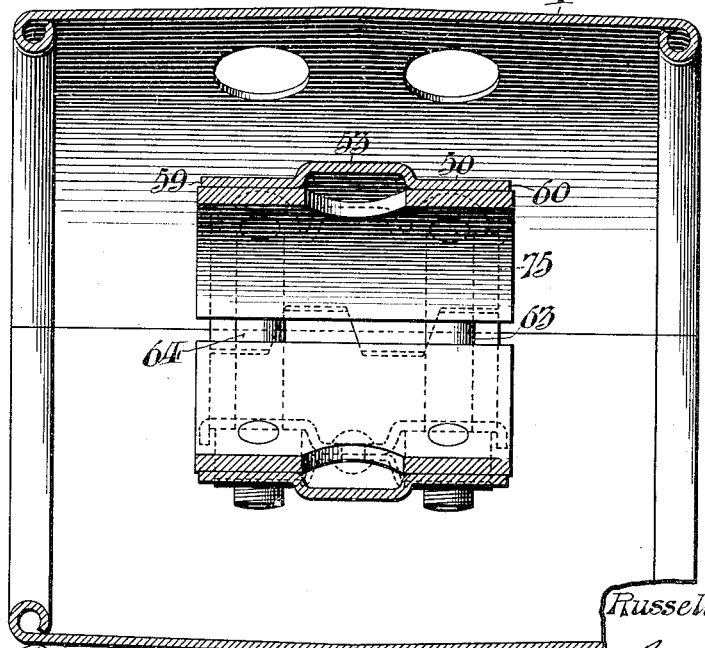
FIG. VI.
Witnesses
John C. Bergner
James H. Bell
Inventor
Russell H. Bowen,
By Kelly & Paul
Attorney R. H. BOWEN.
PULLEY.
APPLICATION FILED AUG. 28, 1912.
1,125,643.
Patented Jan. 19, 1915.
4 SHEETS—SHEET 4.
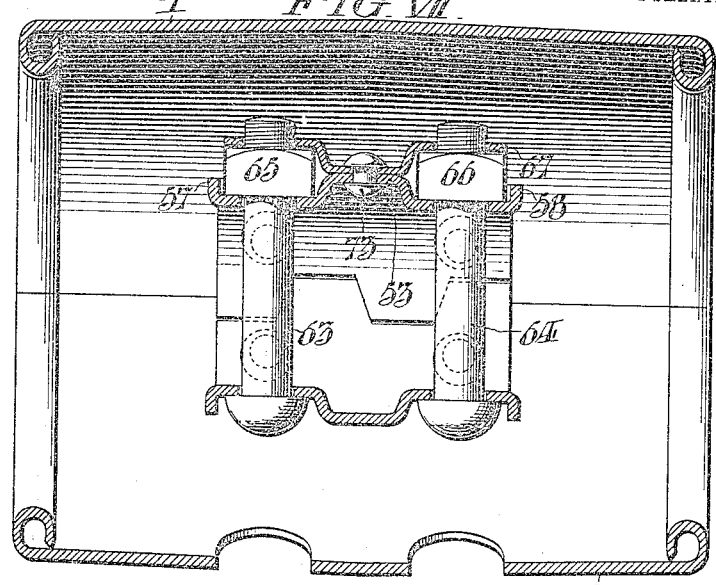
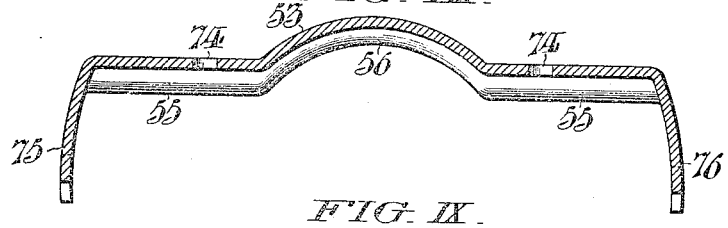
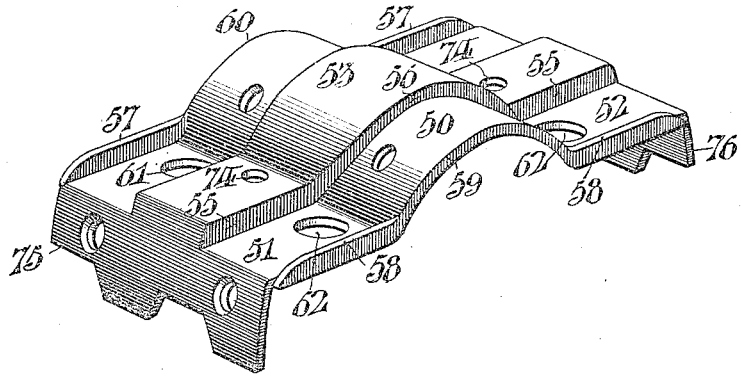
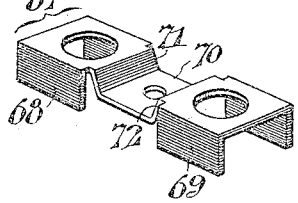
Inventor
Russell H. Bowen,
Witnesses

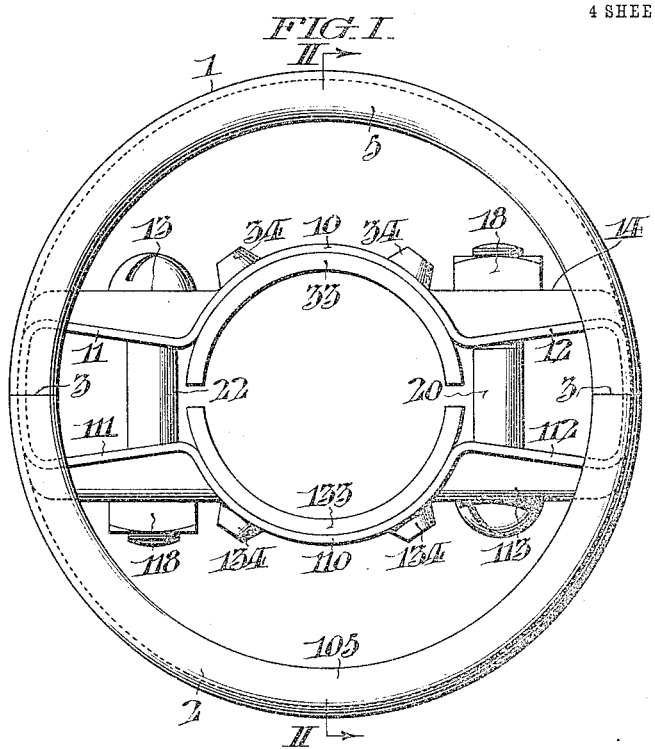

UNITED STATES PATENT OFFICE.

RUSSELL H. BOWEN, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA.

PULLEY.

1,125,643.  Specification of Letters Patent.  Patented Jan. 19, 1915.

Application filed August 28, 1912. Serial No. 717,415.

*To all whom it may concern:*

Be it known that I, RUSSELL H. BOWEN, of Philadelphia, in the county of Philadelphia and State of Pennsylvania, have invented certain new and useful Improvements in Pulleys, whereof the following is a specification, reference being had to the accompanying drawings.

My invention relates to so-called split pulleys of the type which are provided with what may be considered as a single diametrical spoke, said spoke being however a two-part element, one part thereof being located within each half of the pulley. This diametrical spoke element, in such structures, constitutes the means of securing the two halves of the pulley together and also the means for securing the pulley to the shaft; hence, for convenience of description, I shall term the said device a clamping-spoke, and shall refer to each half thereof as a clamping-spoke member.

In the accompanying drawings, Figure I, represents a side elevation of a pulley embodying my invention, in one of its forms. Fig. II, is a vertical axial section thereof, on the line II, II, of Fig. I. Fig. III, is a vertical section thereof, at right angles to the axis, and on the median plane of the pulley, as indicated by the line III, III, in Fig. II. Fig. IV, is a perspective view of one of the clamping-spoke members employed in said form, by which the two parts of the pulley are detachably secured to one another and to the shaft. Figs. V, to X, both inclusive, represent another form of my invention, Fig. V, being a side elevation, Fig. VI, a vertical section on the line VI, VI, of Fig. V, Fig. VII a vertical section on the line VII, VII, of Fig. V, and Fig. VIII, a longitudinal central section through the clamping-spoke member employed in said form; Fig. IX, is a perspective view of said clamping-spoke member, and Fig. X, a view in perspective of one of the socket pieces, or nut-holding devices, which are used in connection therewith.

Referring to Figs. I, to IV, of the drawings, 1, and 2, represent the two half-portions of the pulley, whose rim segments abut against one another, meeting upon the plane indicated at 3, 3. As the respective elements of the two half portions of the pulley are similar, (the positions of certain of the parts being merely reversed), it will be sufficient to set forth in detail only those parts which are comprised in one-half portion, the corresponding parts in the other half not being described, but being indicated by similar numerals raised by one hundred, thus for instance, the part marked 4, in one half portion, is indicated by 104, in the other half.

The rim portion comprises a segmental flat band 4, having fillets 5, and 6, respectively, along its longitudinal sides, said fillets being preferably made of sufficient dimensions to afford a considerable degree of stiffness to the rim. An aperture 7, is formed in the rim at a point adjacent to the screw head of one of the securing devices for the clamping-spoke member about to be described. This clamping-spoke member is shown in perspective in Fig. IV, and comprises a central arched portion, or hub-clamp 10, having laterally projecting spoke portions, the general plane of whose edges 11, and 12, is substantially parallel to the diametrical plane on which the pulley is split, but whose central portions are offset, or raised, as indicated at 13, and 14, respectively, the side walls of said offsets constituting extended rigid abutments located upon each side of the arched portion 10. In the offset portion 14, an inwardly dished recess 17, preferably of square outline is formed, so as to receive the square nut 18, of the screw bolt 20, and retain said nut against turning. A hole 21, is formed in the other offset portion 13, to permit the passage of a similar screw bolt 22. The position of these bolts is reversed, as shown in Figs. I, and III, so that the individual parts of the respective clamping-spoke members may be made identical. At each extremity the spoke-portion is bent abruptly to form an inward projection nearly at right angles to the general plane thereof, but with a contour adapted to fit snugly within the curved inner surface of the rim, and preferably rounded in conformity therewith, as indicated at 15, and 16. These inward projections are relatively deep, extending substantially beyond the terminals of the arc subtended by the arched hub-clamp portion, so that when the edges of the projections upon the two opposing spoke members meet, the spoke-portions will be separated from one another by a considerable distance, as shown in the drawings. The inwardly turned extremities of the clamping-spoke member are provided with lugs 25, 26, and correlative recesses 27, and 28. The edge 29, of the lug 26, which is nearest the observer in Fig. IV, is convex, or outwardly rounded, (as shown more clearly in certain of the dotted lines in Fig. II), so that when applied within the corresponding recess 27, upon the other clamping-spoke member, the ends of the pair meet symmetrically, as indicated by said dotted lines of Fig. II.

Holes 30, are formed in the inwardly projecting end portions of the clamping-spoke member, to receive the rivets 31, whereby said member is secured at each end to the rim portion at points immediately adjacent to the ends of the latter. Within the arched portion 10, is mounted the hub-shell segment 33, which is secured in position by means of the rivets 34. The two clamping-spoke members, carrying their respective hub-shell segments and rim segments, are secured together, and to the shaft, by means of the screw bolts 20, and 22, applied at the rigid abutments, the organization permitting the structure to be formed of a minimum number of parts, since the several elements in one-half of the pulley are identical with those which fulfil similar functions in the other half. It will thus be seen that the clamping-spoke member possesses certain peculiar structural features, viz: the arched middle part, or hub-portion 10, is relatively more pliable and resilient, than the lateral extensions, or spoke-portions 13, and 14, which are highly rigid, owing to the raised walls of the offsets. The projections at the extremities of the spoke-portions are also highly rigid as against the clamping pressure. Hence, when the two halves of the pulley are clamped together upon a shaft, the clamping bolts are applied upon regions which afford practically rigid abutments, and which do not yield to any substantial extent under pressure, while the intermediate arched portions, carrying the hub-shells, have more pliability, which enables them to yield and closely embrace the shaft.

Referring now to the type of device shown in Figs. V, to X, it is unnecessary to describe in detail the rim segments and other parts common to both embodiments of the invention, as the difference lies chiefly in the form of the clamping-spoke member and means of holding the bolt nuts. The clamping-spoke member in this instance comprises the central arched part or hub-portion 50, having the laterally-projecting spoke-portions 51, and 52, whose general plane is parallel to the plane of division of the pulley. A central raised offset 53, extends throughout the entire length of the clamping-spoke member, but the side walls of said offset may advantageously be made somewhat deeper at the spoke-portions than at the hub-portion, as indicated respectively at 55 and 56, in Figs. VIII, and IX. The lateral edges of the spoke-portion are bent or offset at right angles to the general plane thereof, forming offset walls as shown at 57, and 58, while the edges of the hub-portion are unflanged and similar to the general contour of the parts on each side of the central offset walls as shown at 59, and 60. Bolt holes 61, 62 are formed in the flat parts of the spoke-portion to receive the bolts 63, 64. The nuts 65, 66, of said bolts are received within the socket-piece 67, whose details are shown in Fig. X, and which comprises two square end-boxes 68, and 69, connected by a central bridge 70, whose extremities 71, and 72, are bent abruptly downward in substantial correspondence with the contour of the side walls of the offset 53, in the spoke-portions. The socket piece 67, is secured to the offset 53, of spoke-portion by means of a rivet 73, which passes through the hole 74, and the nuts 65, and 66, are held against rotation, or displacement, by means of the inclosure thus formed. The extremities 75, and 76, of the clamping-spoke member are bent inwardly to form abutting projections whose ends are provided with lugs and recesses, as in the former instance, and the devices are applied to the hub and rim in the manner previously described. In this embodiment it will be noted that while the hub-portion is somewhat less resilient, or yielding, than in the other type, by reason of the additional stiffness afforded by the continuation of the offset 53, across the arch, yet the spoke-portions are relatively of much greater rigidity than said hub-portion, since the hub-portion lacks the offset walls like 57, and 58, and moreover the walls of the offset 53, are preferably deeper at the regions of the spoke portions than at the hub-portion. Hence the general results and characteristic functions of the parts are substantially similar in both types.

I am aware that it is not new to construct split pulleys in which each half is provided with a spoke arm having a central arched portion with lateral extensions, and I do not broadly claim such construction. But, so far as I am aware, previous devices of this general character have failed to obtain the localized high rigidity, in the spoke-portions, especially at the region of application of the clamping devices thereto, and at the meeting ends thereof, and the relatively greater pliability at the region of the hub-clamp portion, which factors are the important ones characteristic of my invention.

By my invention I am enabled to avoid the use of separable and distinct adjunctive devices intended to afford different degrees of resiliency or pliability.

Having thus described my invention, I claim:

1. In a split pulley, the combination of, a pair of rim segments; a pair of clamping spoke members, each comprising an arched longitudinal central hub portion and laterally extended spoke portions at the opposite ends of the hub portion and integral therewith, said spoke portions having a cross section adapted to afford substantial rigidity, and said hub portion having a cross section adapted to afford substantial pliability with relation to the rigidity to the spoke portion; the extremities of said spoke portions being provided with inwardly turned projections whose depth substantially exceeds the terminals of the arc subtended by the hub portion, said projections having a contour adapted to fit snugly within the rim segment adjacent to the extremities thereof; and clamping devices having bearing surfaces which abut against the rigid portions of said clamping spoke members, substantially as set forth.

2. In a split pulley, the combination of, a pair of rim segments; a pair of clamping spoke members, each comprising an arched longitudinal central hub portion and laterally extended spoke portions at the opposite ends of the hub portion and integral therewith, said spoke portions having a cross section adapted to afford substantial rigidity, and said hub portion having a cross section adapted to afford substantial pliability with relation to the rigidity to the spoke portion; the extremities of said spoke portions being provided with inwardly turned projections having a contour adapted to fit snugly within the rim segment adjacent to the extremities thereof, said projections being provided, at their meeting edges, with alternating registering lugs and recesses; and clamping devices having bearing surfaces which abut against the rigid portions of said clamping spoke members, substantially as set forth.

In testimony whereof, I have hereunto signed by name at Philadelphia, Pennsylvania, this 23rd day of August 1912.

RUSSELL H. BOWEN.

Witnesses:
JAMES H. BELL,
E. L. FULLERTON.

Copies of this patent may be obtained for five cents each, by addressing the "Commissioner of Patents, Washington, D. C."